United States Patent [19]

Hill

[11] 4,163,064
[45] Jul. 31, 1979

[54] METHOD OF PRODUCING DRIED, DE-SHELLED BRINE SHRIMP CYSTS

[76] Inventor: Marjorie M. Hill, 9903 Candia Dr., Whittier, Calif. 90603

[21] Appl. No.: 884,067

[22] Filed: Mar. 6, 1978

[51] Int. Cl.$^2$ .................... A01K 61/00; A23L 1/325
[52] U.S. Cl. ........................................ 426/2; 426/643
[58] Field of Search ................... 426/2, 643; 119/2

[56] References Cited

U.S. PATENT DOCUMENTS

| | | | |
|---|---|---|---|
| 3,222,186 | 12/1965 | D'Aquin | 426/2 |
| 3,576,643 | 4/1971 | Ayukawa et al. | 426/2 |
| 3,728,988 | 4/1973 | Shapero et al. | 119/2 |
| 3,906,900 | 9/1975 | Hirono et al. | 119/2 |

Primary Examiner—Robert A. Yoncoskie
Attorney, Agent, or Firm—Pollock, Vande Sande and Priddy

[57] ABSTRACT

An edible and hatchable aquaculture product is produced by soaking a quantity of dry brine shrimp eggs in fresh water, then adding an oxidizing agent to the water to dissolve the outer shells of the water-soaked brine shrimp eggs while agitating the eggs and maintaining the temperature of the mixutre below 40° C., separating the resultant denuded cysts from the mixture, rinsing the separated cysts in a neutralizing liquid, and thereafter thoroughly drying the denuded cysts at a temperature below 40° C.

9 Claims, No Drawings

METHOD OF PRODUCING DRIED, DE-SHELLED BRINE SHRIMP CYSTS

BACKGROUND OF THE INVENTION

The present invention is concerned with a process for producing de-shelled or denuded brine shrimp cysts (Artemia Salina and all related species) in the form of dry, easily-stored and handled cysts that are satisfactorily viable and capable of producing brine shrimp cultures that are usable completely as food for all subjects of aquaculture. The method decreases labor costs by eliminating time-consuming processes of separating newly-hatched brine shrimp from unhatched and empty shells, eliminates the waste involved in discarding unhatched eggs since the denuded cysts are 100% edible even in their unhatched state, provides a product which tends to hatch more quickly in hatching cultures and by use of culturing techniques which are already known for the hatching of untreated eggs of the same type so that no new equipment or supplies are necessary, and provides a product which can be stored in less space and shipped at lesser costs due to the dried state of the product and its elimination of heavy useless outer shells.

Newly hatched brine shrimp are a vital food source not only for tropical fish breeders, but also for use in marine fish rearing programs and the entire aquaculture industry involved in the breeding and raising of food fish and crustaceans for human consumption. These industries all depend on this tiny food for feeding young and larval stages of their charges, and these industries would have trouble surviving without the abundant live food represented by brine shrimp cultures.

In recent years, environmental pollution and other man made conditions have reduced the supply of brine shrimp eggs or have, in one way or another, decreased the viability of the remaining eggs. There has always been a tremendous amount of waste in the culturing of brine shrimp eggs, but until recent times this was not considered significant since the supply of brine shrimp eggs was relatively cheap and seemed endless. However, as the quantity and quality of brine shrimp eggs has decreased, costs have soared in direct ratio to the decrease of the yield, and culturing techniques have become vastly more difficult, wasteful, and time-consuming.

The present invention, recognizing these problems, is concerned with a novel process which better utilizes the brine shrimp eggs which are currently available and which, by appropriate treatment of such brine shrimp eggs, provides a product which completely eliminates waste since the contents of a brine shrimp hatcher employing the product of the present invention are entirely usable as food. In addition to the storage and shipping advantages which have been referred to earlier, harvesting of a brine shrimp hatcher using the product of the present invention can be completed quickly and without the tedious steps which would otherwise be required to separate out contaminants and unhatched eggs, thereby significantly reducing labor costs involved in a hatching process while simultaneously increasing its effective yield.

SUMMARY OF THE INVENTION

The present invention provides a novel method for producing dried, de-shelled brine shrimp cysts.

A quantity of brine shrimp eggs, consisting of cysts surrounded by hard outer shells, are initially soaked in fresh water for a period of time sufficient to soften the shells of the eggs and to cause the cysts of said eggs to become substantially water saturated thereby to assure that they will not absorb the oxidizing agent which is added as a next step in the process.

Following the soaking step, an oxidizing agent, such as household bleach, is added to the water bath to dissolve the softened outer shells of the eggs. As the shells dissolve, the reaction produces heat; and, in order to avoid damage to the cysts, the temperature of the mixture is maintained below 40° C. by adding ice to the mixture if necessary. The color of the mass changes as the brown outer shells dissolve, leaving the pinkish cysts contained within a clear membrane at the end of the denuding step.

The mixture is then poured off through a fine mesh, and rinsed well with water to which a neutralizing agent has been added (e.g., if the oxidizing agent is alkaline, the neutralizing agent is acidic) followed by a clear water rinse.

The denuded cysts are soaked in a saturated saline solution until they have lost their fresh water content to the brine solution. This brine is poured off through a fine mesh, and the cysts are then packed into fresh saturated brine and stored in air-tight containers in a dark area or in a freezer until ready for use or for further processing.

Following the rinsing step, or after the cysts have been held in saturated saline solution or even after freezing if these particular preservation steps are employed, the cysts are redried. The cysts must be handled gently while wet, and must be processed until thoroughly dry. Drying can be effected by placing the cysts in a large very fine mesh bag through which cool air is blown as the cysts are agitated to keep them in motion. The drying air can be at room temperature and should, in any event, be maintained at a temperature below 40° C. to avoid loss of viability of the cysts. Instead of blow drying, the cysts can be dried by a freeze drying process.

The re-dried denuded cysts are very small in size, extremely light in weight, and accordingly highly marketable per se. Large volumes can be packed, stored or shipped in very small amounts of space. The packages employed for this purpose should protect the cysts from ultraviolet rays to which they are quite vulnerable when their protective shells are removed. Moreover, the cysts should be handled with the same precautions against heat and moisture as are employed for untreated cysts. The product provides brine shrimp cultures which are 100% usable as food sources for aquaculture since any eggs which remain unhatched are nevertheless edible. Moreover, the product eliminates the labor costs and waste which are conventionally associated with culturing eggs that have their shells intact.

DESCRIPTION OF THE PREFERRED EMBODIMENTS

The starting material employed in the process of the present invention is dry brine shrimp eggs (Artemia Salina and all related species) which are commercially collected from natural growing areas in many parts of the world.

The eggs are first soaked in fresh water to soften the shells and to allow absorption of fresh water by the cysts so that they will not later absorb the oxidizing agent which is added during the denuding step. The temperature and quality of water used for this soaking step is not significant, and all types of tap water, hard or soft, acid or alkaline, are satisfactory. The time of soaking is, however, important since it should be sufficiently long to thoroughly saturate the eggs so that they will not absorb the oxidizing medium which is subsequently added. It has been found that the soaking time should be at least an hour, although a slightly longer time period is acceptable. The eggs should preferably be agitated in some fashion during the soaking step, e.g., by stirring, streaming air bubbles through the mixture, shaking, or by any other method that will ensure that the eggs absorb water evenly over the entire surface of the egg.

Following the water soaking step, an oxidizing agent is added to the water to react with and dissolve the shells. An aqueous solution of chlorine, commonly called "chlorine water" and consisting of a mixture of chlorine, hydrochloric acid and hypochlorus acid, can be used for this purpose since it has strong oxidizing properties. However it is preferable, in accordance with the present invention, to use simple household bleach (consisting of 5.25% by weight sodium hypochlorite in water solution) as the oxidizing agent. This preferred oxidizing agent is alkaline rather than acid, and can readily be neutralized by weak acids during subsequent rinsing steps. Household bleach adapted to be employed at this step of the process is commercially available as the trademarked products "Chlorox," "Purex," etc.

In the preferred practice of the invention, the ratio of household bleach to soaking water is 2:3. However this particular ratio is not critical and can be varied. Increasing the amount of bleach employed speeds up the reaction but produces more heat during the reaction, while decreases in the amount of bleach employed slows up the reaction until the point is finally reached where the amount of bleach is insufficient to dissolve the shells. Two parts of bleach to three parts of water completely denudes cysts in from three to five minutes. The cysts must be kept in constant motion during the denuding step so that the dissolving process is uniform throughout the mass, and heat formed by the reaction must be counteracted, if necessary, by the addition of ice to assure that the temperature of the mixture is maintained below 40° C. during the denuding step thereby to avoid affecting the viability of the cysts.

As the reaction proceeds, the color of the mass changes from brown to orange-pink since the hard egg shells are dissolved away leaving a mass of brine shrimp cysts each of which is encased in a clear membrane. It is preferable that the eggs not be left in the oxidizing mixture for over five minutes, but it has been found that the eggs can be left in said mixture for as high as twenty minutes without damage to the cyst.

Following the denuding step, the cysts are separated from the mixture by pouring the mixture through a fine brine shrimp net. The contents of the net are then thoroughly rinsed with fresh water, whereafter the net and its contents are dipped into a weak acid solution, e.g., fresh water to which vinegar has been added, to neutralize any remaining bleach on the cysts, whereafter the contents of the net are rinsed again in fresh water. Various weak acids can be employed in this neutralizing step, e.g., acetic acid, citric acid, and other known acidic liquids.

The denuded cysts can, if desired, be preserved by soaking them in a saturated saline solution for about one hour or until they have lost their fresh water content to the brine solution. This brine is then poured off through a fine mesh and the cysts are packed into fresh saturated brine and stored in an air-tight container in a dark area or in a freezer until ready for use or for further processing. Following such storage in saline solution, or immediately following the aforementioned rinsing steps if saline storage is not employed, the cysts are redried to produce the final product of the present invention.

The drying of the denuded cysts represents an extremely important step in the process of the present invention. Contrary to normal expectation, it has been found that such redrying of the denuded cysts can be effected without reducing the viability of the tiny creature inside each cyst. In the preferred embodiment of the invention, the redrying step is effected by blow drying the cysts without addition of heat, and cysts that are so dried can be held for at least a month without losing viability. The cysts must be handled gently while wet and must be processed until thoroughly dry. Blow drying of the cysts can be accomplished in many ways, but the preferred technique is to place the cysts in a large very fine mesh bag through which cool air is blown as the cysts are agitated to keep them in motion. The temperature of the air can be room temperature (20°-22° C.) but must, in any event, be kept below 40° C. since the use of air at temperatures in excess of that limit reduces the viability of the cysts considerably. When room temperature air is employed, thorough drying requires approximately one hour. The air employed should impinge on the cysts with sufficient velocity to break up damp clumps.

A typical example of the process of the present invention is as follows:

(a) Place one level teaspoon of brine shrimp eggs in three ounces of fresh water, and soak for one hour while keeping the eggs in motion by occasionally stirring or by aeration with an air bubbler or air stone so that the eggs will absorb the water evenly on all surfaces.

(b) At the end of one hour add two ounces of household bleach (e.g., "Chlorox" or "Purex"). Stir continuously for three-five minutes.

(c) At the end of five minutes, pour the mixture through a fine brine shrimp net, rinse the contents of the net thoroughly with fresh water, and then dip the net and its contents into one cup of fresh water to which one tablespoon of vinegar has been added to neutralize any remaining liquid chlorine. Then rinse again in fresh water.

(d) Soak the denuded cysts in approximately two ounces of saturated brine (as little as one ounce will suffice, or amounts in excess of two ounces can be employed without changing the end results) for approximately one hour or until they have lost their fresh water content to the brine solution. Then pour the brine off through a fine mesh.

(e) Blow dry the cysts, placed in a large very fine mesh bag and agitated to keep them in motion, until thoroughly dry by blowing air at substantially 70° F., and with sufficient velocity to break up damp clumps, through the fine mesh bag for approximately one hour.

(f) Enclose the dried, denuded cysts in a packaging material that blocks ultraviolet light and is moisture proof. Metal cans, sealed foil packages, sealed plastic with a light-proof wrapping, opaque plastic jars or bottles, opaque or brown glass containers, etc. are acceptable. The packages employed can be resealable opaque polypropylene or polyethylene plastic containers or indivdual foil packages each of which contains the proper measure of eggs for adding to one gallon of hatching mix. The packages should be provided with a warning to keep them in a cool place.

While I have thus described preferred embodiments of the present invention, many variations will be apparent to those skilled in the art. It must therefore be understood that the foregoing description is intended to be illustrative only and not limitative of the present invention, and all such variations and modifications as are in accord with the principles of the present invention are meant to fall within the scope of the appended claims.

Having thus described my invention I claim:

1. The method of producing an edible and hatchable aquaculture product, comprising the steps of soaking a quantity of brine shrimp eggs, consisting of cysts surrounded by outer shells, in water for a time sufficient to saturate the eggs, immersing the saturated eggs in a chlorine type oxidizing liquid medium for a time sufficient to cause the shells of said eggs to dissolve into said medium while maintaining the temperature of said medium below 40° C., separating the resultant denuded egg cysts from said medium, and thereafter drying said denuded cysts at a temperature below 40° C.

2. The method of claim 1 wherein said drying step comprises blow-drying said cysts by placing said denuded cysts in a fine mesh bag, and blowing air through said bag until the cysts in said bag are thoroughly dry.

3. The method of claim 1 wherein the temperature of said medium is maintained below 40° C. by adding ice to said medium while the shells of said eggs are dissolving.

4. The method of claim 1 wherein said drying step comprises freeze-drying said denuded cysts.

5. The method of claim 1 including the step, following said drying step, of packaging said dried cysts in a protective material operative to prevent exposure of said denuded cysts to ultraviolet rays.

6. The method of producing an edible and hatchable aquaculture product, comprising the steps of soaking a quantity of dry brine shrimp eggs in fresh water for a time sufficient to saturate the eggs, thereafter denuding said eggs by adding a solution of sodium hypochlorite to said fresh water in sufficient quantity to provide an alkaline medium capable of dissolving the outer shells of said water-soaked eggs and retaining said eggs in said medium for a time sufficient to dissolve the outer shells of said eggs, agitating the eggs in said medium while maintaining the temperature of said medium below 40° C. during the dissolving of said shells, separating the resultant denuded cysts from said medium by pouring said mixture of cysts and medium through a fine mesh, rinsing the separated denuded cysts in an acidic liquid to neutralize any residual alkaline medium thereon, and thereafter drying said denuded cysts while maintaining the temperature of said cysts below 40° C.

7. The method of claim 6 wherein said drying step comprises blow-drying said denuded cysts with air having a temperature less than 40° C.

8. The method of claim 6 wherein said drying step comprises freeze-drying said denuded cysts.

9. The method of claim 6 including the step, following said drying step, of enclosing said dried denuded cysts in a moisture-proof ultraviolet proof packaging material.

* * * * *